(12) United States Patent
Dickow et al.

(10) Patent No.: US 10,015,639 B2
(45) Date of Patent: Jul. 3, 2018

(54) VEHICLE SEATING ZONE ASSIGNMENT CONFLICT RESOLUTION

(71) Applicant: MYINE ELECTRONICS, INC., Ferndale, MI (US)

(72) Inventors: Justin Dickow, Royal Oak, MI (US); Corey Maylone, Berkley, MI (US); Scott Smereka, Warren, MI (US); Joey Ray Grover, Madison Heights, MI (US)

(73) Assignee: Livio, Inc., Royal Oak, MI (US)

( * ) Notice: Subject to any disclaimer, the term of this patent is extended or adjusted under 35 U.S.C. 154(b) by 0 days.

(21) Appl. No.: 15/077,391

(22) Filed: Mar. 22, 2016

(65) Prior Publication Data

US 2017/0280302 A1  Sep. 28, 2017

(51) Int. Cl.
| | | |
|---|---|---|
| *H04W 24/00* | (2009.01) | |
| *H04W 4/04* | (2009.01) | |
| *B60R 16/023* | (2006.01) | |
| *B60W 40/08* | (2012.01) | |
| *B60R 25/24* | (2013.01) | |
| *H04W 4/80* | (2018.01) | |

(52) U.S. Cl.
CPC ......... *H04W 4/046* (2013.01); *B60R 16/0231* (2013.01); *B60R 25/245* (2013.01); *B60W 40/08* (2013.01); *H04W 4/80* (2018.02); *B60W 2040/0881* (2013.01)

(58) Field of Classification Search
CPC .. H04W 4/046; H04W 4/008; B60R 16/0231; B60W 40/08; B60W 2040/0881
USPC .................................................. 455/457, 62
See application file for complete search history.

(56) References Cited

U.S. PATENT DOCUMENTS

| | | | |
|---|---|---|---|
| 6,396,412 B1 | 5/2002 | Banas | |
| 7,167,714 B2 | 1/2007 | Dressler et al. | |
| 8,082,096 B2 * | 12/2011 | Dupray | G01S 5/0018 |
| | | | 701/465 |
| 8,135,413 B2 * | 3/2012 | Dupray | H04W 4/02 |
| | | | 455/456.1 |
| 8,232,863 B2 | 7/2012 | Nakajima et al. | |
| 8,319,605 B2 * | 11/2012 | Hassan | G01C 17/38 |
| | | | 340/10.2 |

(Continued)

FOREIGN PATENT DOCUMENTS

| | | |
|---|---|---|
| CN | 101669149 B | 12/2012 |
| WO | 2008131813 A1 | 11/2008 |

*Primary Examiner* — Marceau Milord
(74) *Attorney, Agent, or Firm* — Jennifer M. Stec; Brooks Kushman P.C.

(57) ABSTRACT

A vehicle may identify a highest-ranked seating zone for a mobile device using values determined from signal strengths from wireless sensors, the values indicating probabilities of the mobile device being located in each of a plurality of seating zones. The vehicle may also assign the mobile device to the highest-ranked seating zone if the mobile device indicates a higher probability for the zone than other mobile devices. Responsive to determining the mobile device is located within a vehicle, the mobile device may determine position ranks for each of a plurality of seating zones of the vehicle using signal strength values to vehicle wireless sensors, determine confidence values for each of the seating zones using the position ranks, and receive a seating zone assignment responsive to sending the confidence values to the vehicle.

15 Claims, 9 Drawing Sheets

(56) References Cited

U.S. PATENT DOCUMENTS

| | | | |
|---|---|---|---|
| 8,538,408 B2* | 9/2013 | Howarter | B60R 25/2009 |
| | | | 455/420 |
| 8,634,816 B2* | 1/2014 | Xiao | H04W 4/027 |
| | | | 455/417 |
| 8,744,482 B2* | 6/2014 | Margalef | G01S 5/0252 |
| | | | 340/5.61 |
| 9,008,917 B2* | 4/2015 | Gautama | B60W 10/30 |
| | | | 455/41.2 |
| 9,253,753 B2* | 2/2016 | Rubin | H04W 72/005 |
| 9,332,125 B2* | 5/2016 | Tadayon | H04M 3/53 |
| 9,338,638 B1* | 5/2016 | Palin | H04W 4/008 |
| 2005/0275511 A1 | 12/2005 | Luo et al. | |
| 2006/0153141 A1 | 7/2006 | Hirano | |
| 2007/0200672 A1* | 8/2007 | McBride | B60R 25/245 |
| | | | 340/5.72 |
| 2010/0075655 A1 | 3/2010 | Howarter et al. | |
| 2010/0076622 A1* | 3/2010 | Dickerhoof | B60R 25/24 |
| | | | 701/2 |
| 2010/0305779 A1* | 12/2010 | Hassan | G01C 17/38 |
| | | | 701/2 |
| 2011/0105097 A1 | 5/2011 | Tadayon et al. | |
| 2011/0195699 A1* | 8/2011 | Tadayon | H04B 5/0062 |
| | | | 455/418 |
| 2012/0208520 A1* | 8/2012 | Howarter | B60R 25/2009 |
| | | | 455/420 |
| 2012/0220284 A1* | 8/2012 | Tadayon | H04W 4/025 |
| | | | 455/418 |
| 2012/0244877 A1 | 9/2012 | Margalef et al. | |
| 2013/0029650 A1 | 1/2013 | Xiao et al. | |
| 2016/0227020 A1* | 8/2016 | Tadayon | H04W 4/025 |
| 2016/0227021 A1* | 8/2016 | Tadayon | H04W 4/025 |
| 2017/0208540 A1* | 7/2017 | Egner | H04W 48/18 |
| 2017/0238346 A1* | 8/2017 | Egner | H04W 76/02 |

* cited by examiner

|   | Seating Zone / Position | Signal Strength |
|---|---|---|
| Snapshot 404-A | A0 | -64 |
|  | A1 | -69 |
|  | B0 | -66 |
|  | B1 | -70 |
| Snapshot 404-B | A0 | -63 |
|  | A1 | -68 |
|  | B0 | -65 |
|  | B1 | -69 |
| Snapshot 404-C | A0 | -47 |
|  | A1 | -52 |
|  | B0 | -48 |
|  | B1 | -66 |

Position Ranks

Confidence Values

FIG. 6

VEHICLE SEATING ZONE ASSIGNMENT CONFLICT RESOLUTION

TECHNICAL FIELD

Aspects of the disclosure generally relate to conflict resolution for vehicle seating zone assignment.

BACKGROUND

Sales of mobile devices, such as smartphones and wearables, continue to increase. Thus, more mobile devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of mobile devices into the driving experience.

SUMMARY

In a first illustrative embodiment, a system includes wireless sensors; and a processor programmed to identify a highest-ranked seating zone for a mobile device using values determined from signal strengths from the wireless sensors, the values indicating probabilities of the mobile device being located in each of a plurality of seating zones, and assign the mobile device to the highest-ranked seating zone if the mobile device indicates a higher probability of being in the zone than other mobile devices.

In a second illustrative embodiment, a system includes a mobile device having a wireless transceiver and programmed to responsive to determining the mobile device is located within a vehicle, determine position ranks for each of a plurality of seating zones of the vehicle using signal strength values to vehicle wireless sensors, determine confidence values for each of the seating zones using the position ranks, and receive a seating zone assignment responsive to sending the confidence values to the vehicle.

In a third illustrative embodiment, a method includes identifying, from mobile devices, confidence values determined from signal strength data from wireless sensors indicating probabilities of the mobile devices being located in vehicle seating zones; and responsive to two mobile devices indicating a highest confidence value for the same seating zone, assigning the device with the higher confidence value to the zone and the other device to a seating zone for which the other device has a next highest confidence value.

BRIEF DESCRIPTION OF THE DRAWINGS

FIG. 4 illustrates an example table of snapshots of signal strength values corresponding to the movement of the mobile device into the vehicle;

FIG. 5 illustrates an example of position ranks of the signal strength values of a snapshot of the table indicating the mobile device is within the vehicle;

FIG. 6 illustrates an example of confidence values for the position ranks of the snapshot;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A user may enter a vehicle, and a smartphone or other personal device carried by the user may determine position ranks for each of a plurality of seating zones of the vehicle. These ranks may be determined using signal strength values to vehicle wireless sensors embedded within the vehicle doors. The position rank values may be used to create confidence values indicating probabilities of the mobile device being located in each of a plurality of seating zones. The mobile device may send the confidence values to a computing platform of the vehicle, e.g., using JavaScript Object Notation (JSON) or another technique, where the vehicle computing platform may use the confidence values to identify in which seating zone the mobile device is most likely located.

In some cases, multiple mobile devices may enter the vehicle, and two or more of the devices may identify as mostly likely being located in the same seating position. In such cases, a conflict resolution procedure is performed to deterministically resolve which devices are associated with which seating zones. For example, the computing platform may assign the mobile device having the highest confidence value to the seating zone that multiple mobile devices each identify as being the most likely. The mobile devices having less than the highest confidence value may instead be assigned to their next most likely choice. The conflict resolution procedure may continue until each mobile device is assigned to a seating zone without conflict. Further details are discussed below.

Figure 1:
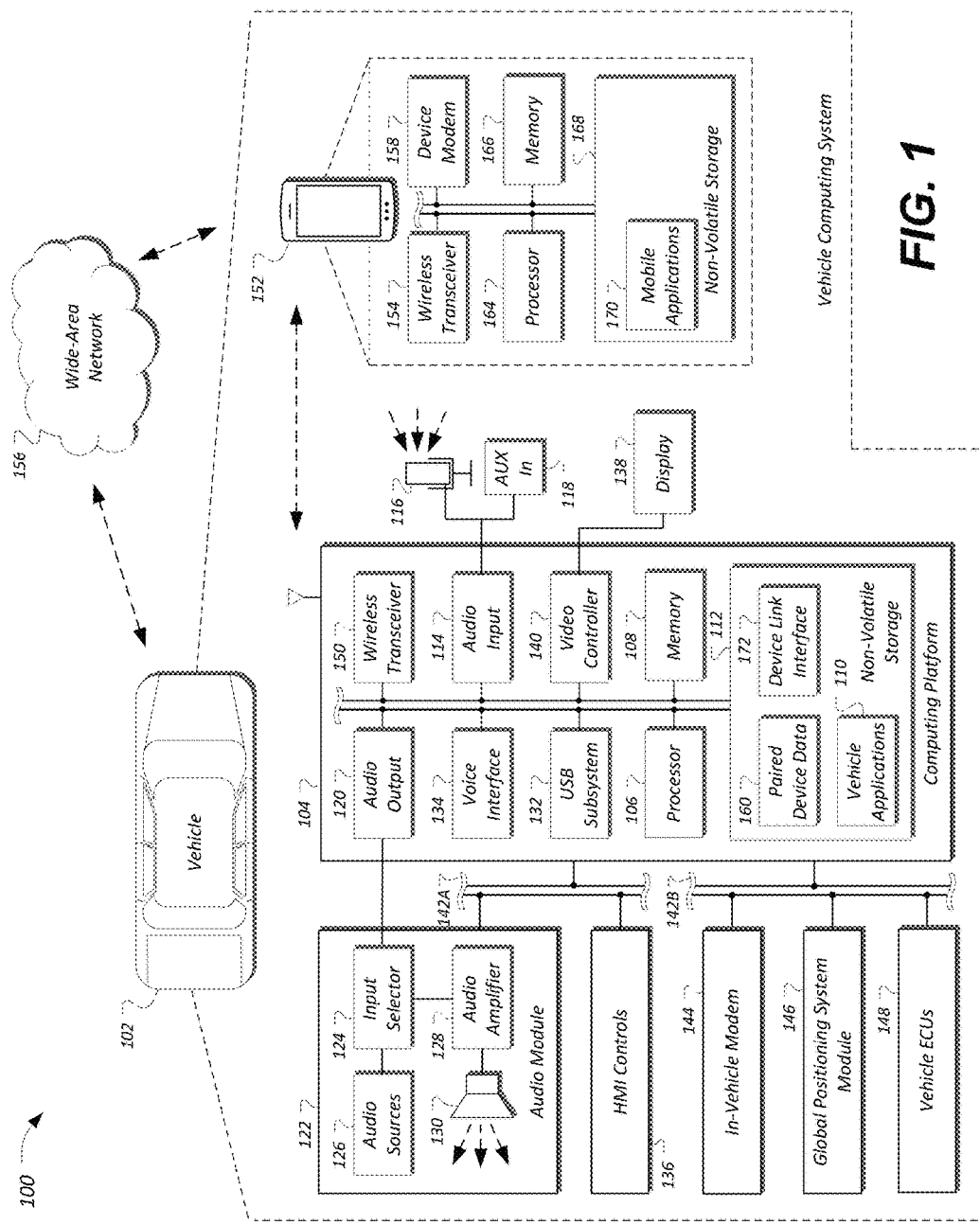
FIG. 1 illustrates an example diagram of a system that may be used to provide telematics services to a vehicle.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e. g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configure to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an vehicle modem 144 (which may not be present in some configurations), a global positioning system (GPS) module 146 configured to provide current vehicle 102 location and heading information, and various vehicle ECUs (Electronic Control Units) 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142, and the vehicle modem 144, GPS module 146, and vehicle ECUs 148 may communicate with the computing platform 104 over a second in-vehicle network 142. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

Figure 2:
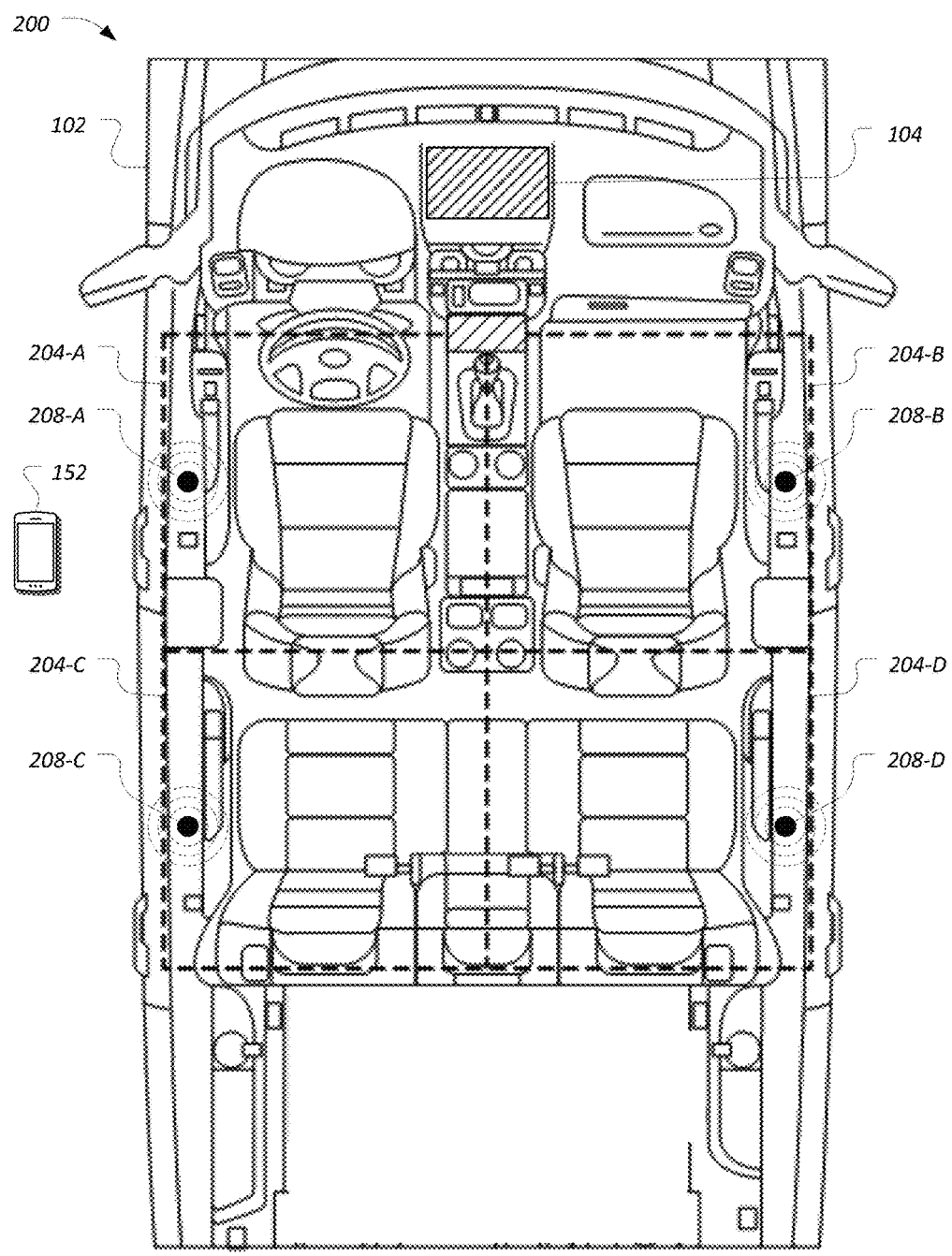
FIG. 2 illustrates an example diagram of the system illustrating the vehicle having an array of wireless sensors for use in assigning mobile devices to seating zones.

FIG. 2 illustrates an example diagram 200 of the system 100 illustrating the vehicle 102 having an array of wireless sensors 208-A through 208-D (collectively 208) for use in assigning mobile devices 152 to seating zones 204-A through 204-D (collectively 204). The assignment of mobile devices 152 to seating zones 204 may be performed by the mobile devices 152 or the computing platform 104 based on data about the signal strength between the mobile devices 152 and the wireless sensors 208. The assignment of mobile devices 152 to seating zones 204 may be used, in an example, to determine which features of the computing platform 104 are applicable to the location of the mobile devices 152. It should be noted that the illustrated system 100 is merely an example, and more, fewer, and/or differently located elements may be used. For examples, different vehicles 102 may include more, fewer, or differently-arranged seating zones 204 and/or wireless sensors 208.

The vehicle 102 interior may be divided into multiple zones 204, where each seating zone 204 may be associated with a seating position within the vehicle 102 interior. For instance, the front row of the illustrated vehicle 102 may include a first zone 204-A associated with the driver seating position, and a second zone 204-B associated with a front passenger seating position. The second row of the illustrated vehicle 102 may include a third zone 204-C associated with a driver-side rear seating position and a fourth zone 204-D associated with a passenger-side rear seating position.

The wireless sensors 208 may include various types of wireless transceivers configured to communicate wirelessly with the mobile devices 152. In an example, the wireless sensors 208 may include one or more of a BLUETOOTH module, a ZIGBEE transceiver, a Wi-Fi transceiver, an IrDA transceiver, an RFID transceiver, etc. configured to communicate with compatible wireless transceivers 154 of the mobile devices 152.

The wireless sensors 208 in the vehicle 102 may support BLE or another wireless technology that can provide distance or signal measurements between the mobile devices 152 and the wireless sensor 208. For instance, the mobile devices 152 may communicate with wireless sensors 208 supporting BLE to capture received signal strength information (RSSI) provided by BLE protocol. In such a BLE example, the wireless sensors 208 of the vehicle 102 may advertise as BLE Peripherals, and the mobile device 152 may scan for BLE Peripherals as a BLE Central.

In some examples, the wireless transceiver 150 of the computing platform 104 may allow the computing platform 104 to communicate with the wireless sensors 208. For instance, the computing platform 104 may communicate with the wireless sensors 208 to receive the signal strength information between the wireless sensors 208 and the mobile devices 152. As another possibility, the computing platform 104 may communicate with the wireless sensors 208 over wired connections. For instance, the computing platform 104 may communicate with the wireless sensors 208 over wired universal serial bus (USB) connections connecting the computing platform 104 to the wireless sensors 208.

The wireless sensors 208 may be configured to provide signal strength information to indicate a stronger signal as the mobile device 152 approaches the wireless sensor 208, and a weaker signal as the mobile device 152 departs from the wireless sensor 208. As another possibility, the wireless sensors 208 may be configured to provide distance information indicating a measure of the distance between the wireless sensor 208 and the mobile devices 152 that becomes smaller as the mobile devices 152 approaches the wireless sensor 208, and that becomes greater as the mobile device 152 departs from the wireless sensor 208. Triangulation or other techniques may then be used to locate the mobile device 152 within the vehicle using the signal strength or distance information of connections between the mobile device 152 and each of the array of wireless sensors 208.

The wireless sensors 208 may be arranged within each of the doors of the vehicle 102. In the illustrated example, the wireless sensor 208-A is included in the front driver-side door, the wireless sensor 208-B is included in a second-row or rear driver-side door, the wireless sensor 208-C is included in the front passenger-side door, and the wireless sensor 208-D is included in a second-row or rear passenger-side door.

As a more specific example, the wireless sensors 208 may be implemented as iBeacons configured to expose a universally unique identifier (UUID) for use in the device location, with the 8 byte major and 8 byte minor values configured to identify the vehicle 102 in which the wireless sensor 208 is located and the location within the vehicle 102. As one possibility, the 8 bytes of the major value plus the first 5 bytes of minor value may be used to provide the vehicle identifier (e.g., all wireless sensors 208 with a given vehicle identifier are in the same vehicle 102). The last 3 bytes of the minor value may be used to indicate where in the vehicle 102 the respective wireless sensor 208 is located. For instance, the wireless sensor 208-A may indicate a location value of '1' to indicate the front driver door, the wireless sensor 208-B may indicate a location value of '2' to indicate the front passenger door, the wireless sensor 208-C may indicate a location value of '3' to indicate the rear driver door, and the wireless sensor 208-D may indicate a location value of '4' to indicate the rear passenger door.

Variations on the number and arrangement of zones 204 are possible. For instance, an alternate second row may include an additional fifth zone 204-E of a second-row middle seating position (not shown). Or, a vehicle 102 having a third row may have an additional fifth zone 204-E behind the third zone 204-C and an additional sixth zone 204-F behind the fourth zone 204-D (not shown). It should be noted that differences in the zones 204 may affect the arrangement of wireless sensors 208. For instance, a vehicle 102 having additional rows of doors may require additional wireless sensors 208 within the additional doors.

Figure 3A:
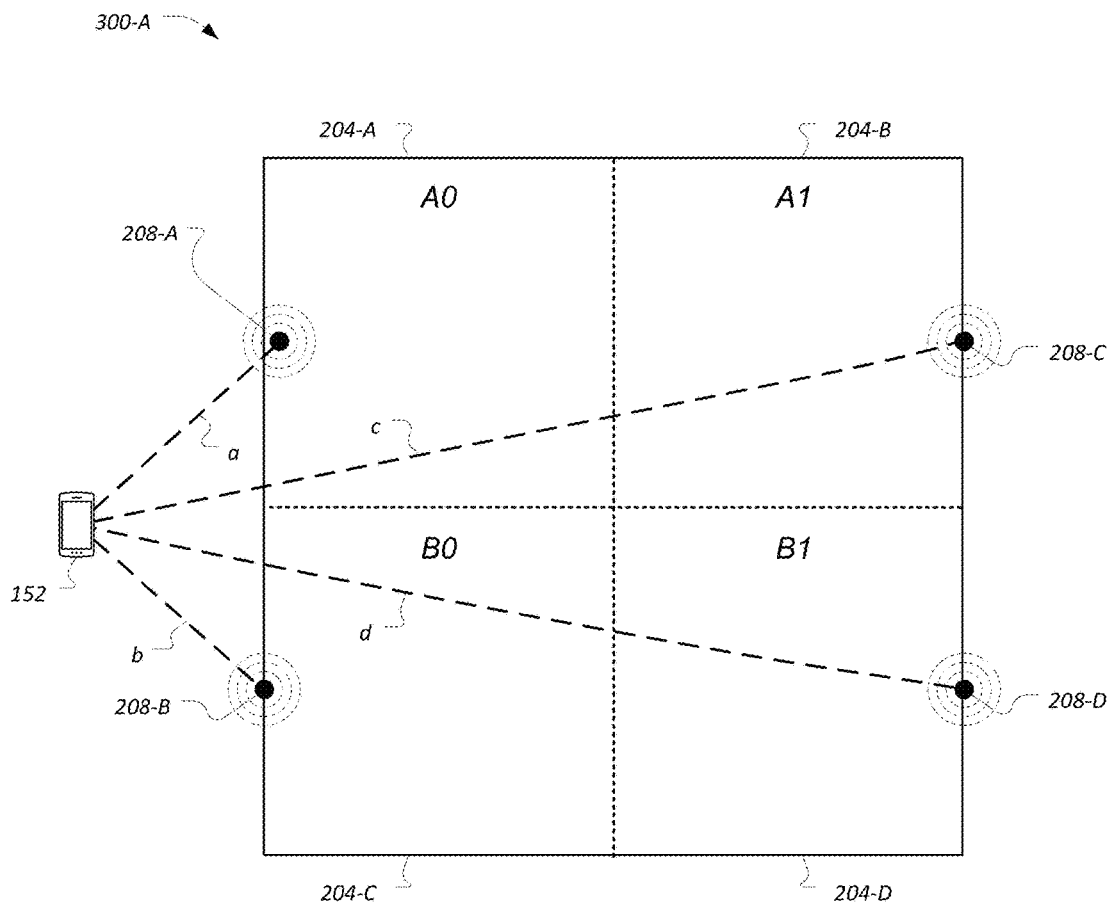
FIGS. 3A-3C illustrate example diagrams of movement of a mobile device into the driver seating zone of the vehicle.
Figure 3B:
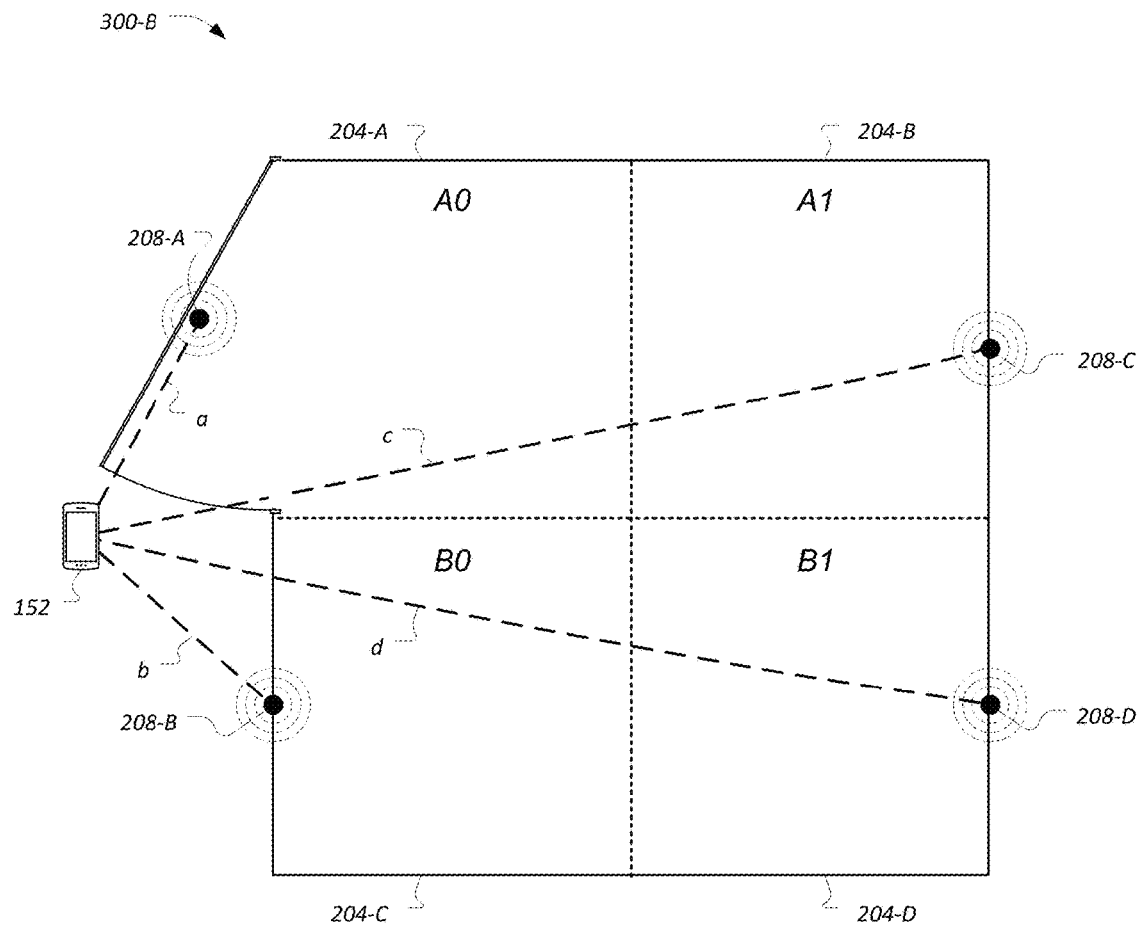
Figure 3C:
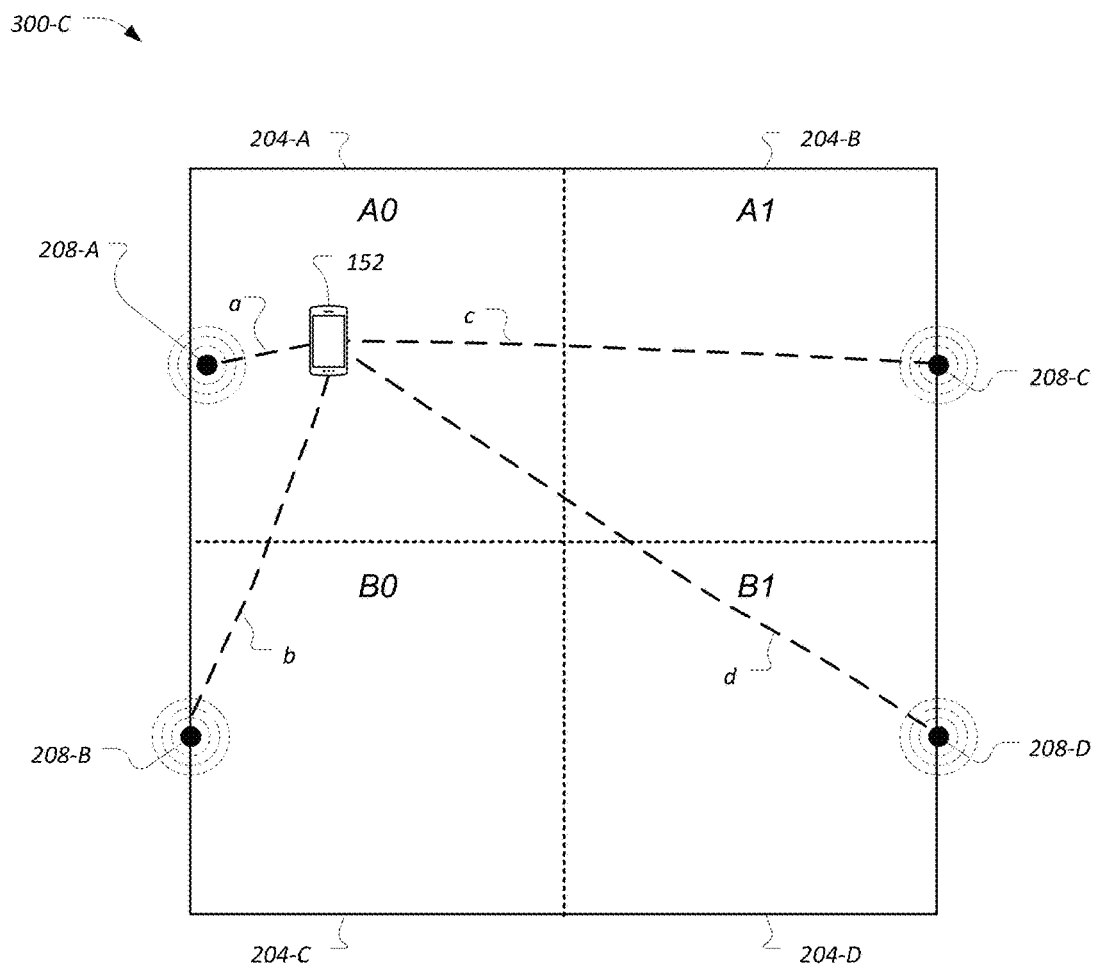

FIGS. 3A-3C illustrate an example 300 of movement of a mobile device 152 into the driver seating zone 204 of the vehicle 102. FIG. 3A illustrates an example 300-A including the mobile device 152 before the mobile device 152 has begun to enter the vehicle 102. FIG. 3B illustrates an example 300-B including the mobile device 152 when the vehicle door 102 has been opened as the mobile device 152 is entering the vehicle 102. FIG. 3C illustrates an example 300-C including the mobile device 152 having entered the vehicle 102. Moreover, each of the examples 300-A through 300-C illustrates a state of the signal strength/distance information collected from the wireless sensors 208 during entry of a user into the vehicle 102.

The distance between each wireless sensor 208 and the mobile device 152 may be tracked. As shown, the distance between the wireless sensor 208-A and the mobile device 152 is indicated as the distance a, the distance between the wireless sensor 208-B and the mobile device 152 is indicated as the distance b, the distance between the wireless sensor 208-C and the mobile device 152 is indicated as the distance c, the distance between the wireless sensor 208-D and the mobile device 152 is indicated as the distance d. It should be noted that many examples herein reference the values a, b, c, and d in terms of signal strength, in which higher values indicate closer proximity. In other examples however, the values a, b, c, and d may be distance values in which lower values indicate closer proximity. In examples in which the values a, b, c, and d relate to distance, the analysis in terms of increasing and decreasing values may be reversed.

In the illustrated examples 300-A through 300-C, the vehicle 102 includes four seating zones 204-A through 204-D. The example 300 also includes four wireless sensors 208-A through 108-D, where each sensor 208 is included within a door to one of the four seating zones 204-A through 104-D. The locations of the wireless sensors 208 may be determined by the mobile device 152 from information broadcast or otherwise provided by the wireless sensors 208 as discussed above.

When the mobile device 152 arrives into range of the wireless sensors 208 of the vehicle 102 (e.g., within range of BLE advertisements of the wireless sensors 208), the mobile device 152 may initiate tracking of the values a, b, c, and d. For instance, the mobile device 152 may maintain information indicative of the values a, b, c, and d over time in a memory of the mobile device 152.

FIG. 4 illustrates an example table 400 of snapshots 402-A through 402-C (collectively 402) of signal strength values corresponding to the movement of the mobile device 152 into the vehicle 102. Each snapshot 402 of RSSI values includes a value captured from each one of the plurality of wireless sensors 208-A, 208-B, 208-C and 208-D. Continuing with the example 300, the snapshots 402 indicate signal strength data from the wireless sensors 208 while a user approaches the vehicle 102 and enters through the driver door while carrying the mobile device 152. The table 400 may be representative, for example, of the RSSI values a, b, c, and d tracked by the mobile device 152 illustrated in the example 300 above.

FIG. 5 illustrates an example of position ranks 500 of the signal strength values of a snapshot 402 of the table 400 indicating the mobile device 152 is within the vehicle 102. The position ranks 500 may indicate the signal strength values of the mobile device 152 as included in the possible seating zones 204 of the vehicle 102.

The position ranks 500 for the mobile device 152 may be determined based on an identification of the mobile device 152 as being located inside the vehicle 102. In an example, the mobile device 152 performs hypothesis testing to identify whether the mobile device 152 is inside the vehicle 102. The mobile device 152 may monitor the received snapshots 402 against a threshold signal strength value to determine whether the mobile device 152 is at considered to be inside the vehicle 102. The first threshold signal strength value may be set to −50 dBm (decibel-milliwatts), although different threshold values may be used. The signal strength values of the snapshot 402 may be compared to the first threshold signal strength value, such that if one or more (or in other examples all) of the values meet the threshold value, the mobile device 152 passes the test. As shown in FIG. 4, the snapshot 402-C of the table 400 passed the hypothesis test; therefore, the position rank 500 of FIG. 5 reflects the signal strength values of the snapshot 402-C.

FIG. 6 illustrates an example of confidence values 600 for the position ranks 500 of the snapshot 402. The confidence values 600 computed for the position ranks 500 are indications of the probability of the user of the mobile device 152 being located in each of the seating zone 204 positions of the vehicle 102. Accordingly, the confidence values 600 provide more information than a single indication of in which seating zone 204 the user is located.

The confidence values 600 may be computed from the position ranks 500. For example, one example method to compute the confidence values 600 includes identifying the peak signal strength value, and dividing it by the threshold value. Using the position ranks 500 values of FIG. 5 and the −50 dBm threshold discussed above, the confidence values 600 may be determined as follows:

$$A0 = -47/-50 = 0.94$$

$$B0 = -48/-50 = 0.96$$

$$A1 = -52/-50 = 1.04$$

$$B1 = -66/-50 = 1.32$$

In this example, the lower the confidence value 600, the more likely the corresponding mobile device 152 is located within that seating zone 204.

As shown, the confidence values 600 indicate that the mobile device 152 identifies itself as being in the A0 seating zone 204 with a confidence of 0.94, in the B0 seating zone 204 with a confidence of 0.96, in the A1 seating zone 204 with a confidence of 1.04, and in the B1 seating zone 204 with a confidence of 1.32. Thus, the confidence values 600 indicate that the mobile device 152 is most likely within the A0 seating zone 204.

In a situation in which the mobile device 152 is the only mobile device 152 within the vehicle 102, the mobile device 152 may be identified as being within the A0 seating zone 204. However, in other cases, multiple mobile devices 152 may be within the vehicle 102 and may each be assigned their own confidence values 600 with respect to the seating zones 204.

As one possibility, as mobile devices 152 determine their confidence values 600, the mobile devices 152 may send the confidence values 600 to the computing platform 104. In response, the computing platform 104 may perform zone conflict resolution if there are inconsistencies in the confidence values 600. For instance, conflict resolution may be performed when multiple mobile devices 152 indicate the same seating zone 204 as the seating zone 204 in which the mobile device 152 has a highest confidence value 600 of being located.

Figure 7A:
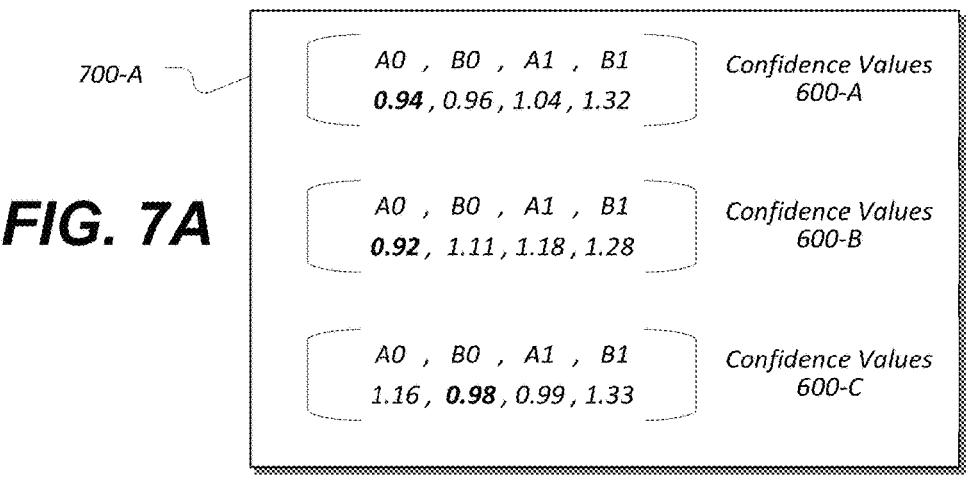
FIGS. 7A-7C illustrate example diagrams of zone conflict resolution of confidence values for a plurality of mobile devices.
Figure 7B:
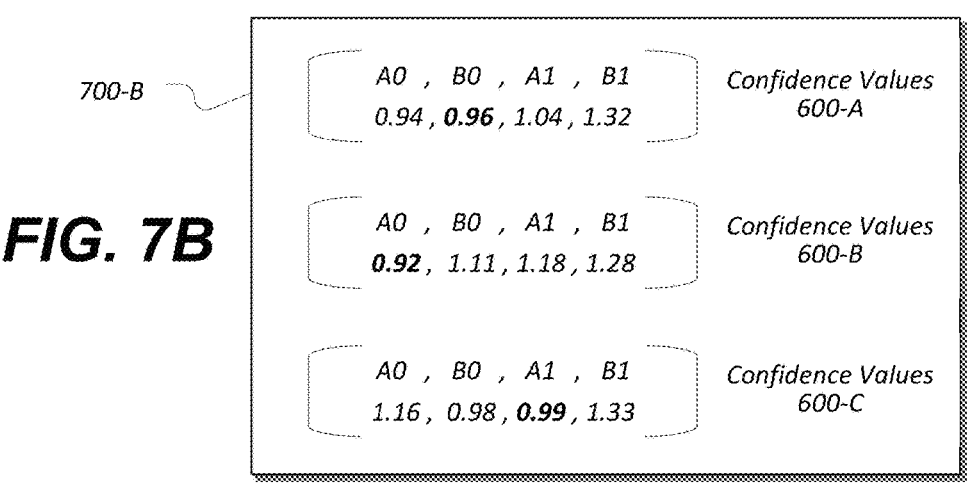
Figure 7C:
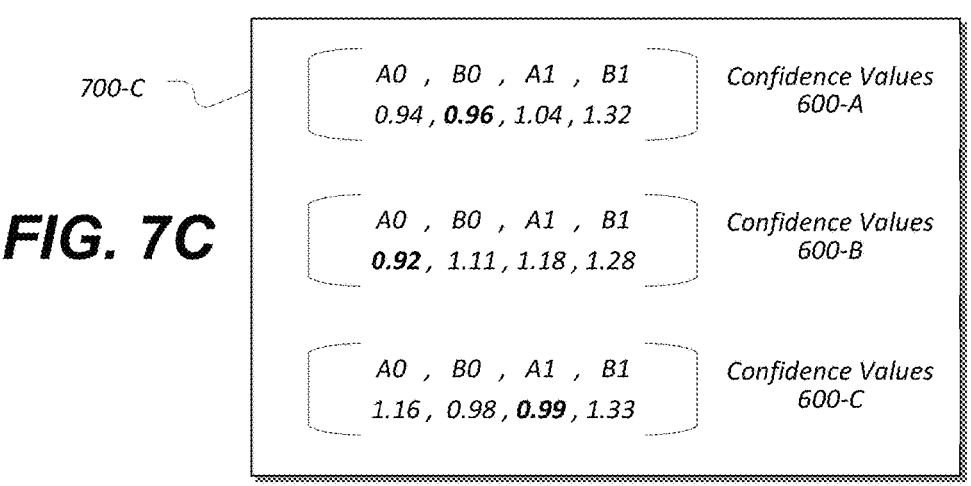

FIGS. 7A-7C illustrate example diagrams 700-A through 700-C (collectively 700) of zone conflict resolution of confidence values 600 for a plurality of mobile devices 152. As one example, the computing platform 104 may receive the confidence values 600-A from a mobile device 152-A, the confidence values 600-B from the mobile device 152-B, and the confidence values 600-C from the mobile device 152-C. While each of the example diagrams 700 includes confidence values 600 for three mobile devices 152, examples having confidence values 600 from more or fewer mobile devices 152 are possible.

Referring to FIG. 7A, the example diagram 700-A includes confidence values 600-A indicating that the mobile device 152-A is identified as most likely being in the A0 seating zone 204, with a confidence value 600 of 0.94. The mobile device 152-B, however, also is identified as most likely being in the A0 seating zone 204, but with a confidence value 600 of 0.92. Additionally, the mobile device 152-A indicates as most likely being in the B0 seating zone 204, with a confidence value 600 of 0.98.

Notably, both the mobile device 152-A and the mobile device 152-B each indicate that A0 is the most likely seating zone 204. However, the users of both mobile devices 152 are deemed not to both be sitting in the same seating zone 204. Accordingly, the computing platform 104 may resolve the inconsistency by assigning the mobile device 152 to the contested seating zone 204 as the mobile device 152 having the most confident value. In the illustrated example, the mobile device 152-B is indicated as having better confidence value 600 of being in the A0 seating zone 204. Accordingly, the mobile device 152-B is deemed to be in the A0 seating zone 204, and the mobile device 152-A is moved to its next most confident seating zone 204.

Referring to FIG. 7B, the example diagram 700-B illustrates the mobile device 152-B assigned to the A0 seating zone 204, and the mobile device 152-A now assigned to its next most-confident seating zone 204 according to the confidence values 600 (i.e., the B0 seating zone 204). However, now the mobile device 152-A and the mobile device 152-C each indicate that B0 is the most likely seating zone 204. Accordingly, as the mobile device 152-A is indicated as having better confidence value 600 of being in the B0 seating zone, the mobile device 152-C is moved to its next most confident seating zone 204 (i.e., the A1 seating zone 204).

Referring to FIG. 7C, the example diagram 700-C illustrates the mobile device 152-B assigned to the A0 seating zone 204, the mobile device 152-A assigned to the B0 seating zone, and the mobile device 152-C now assigned to its next most-confident seating zone 204 (i.e., the A1 seating zone).

As no more conflicts remain, the zone conflict resolution is complete. However, it should be noted that the zone conflict resolution may be performed again, for example when additional mobile devices 152 enter the vehicle 102.

Figure 8:
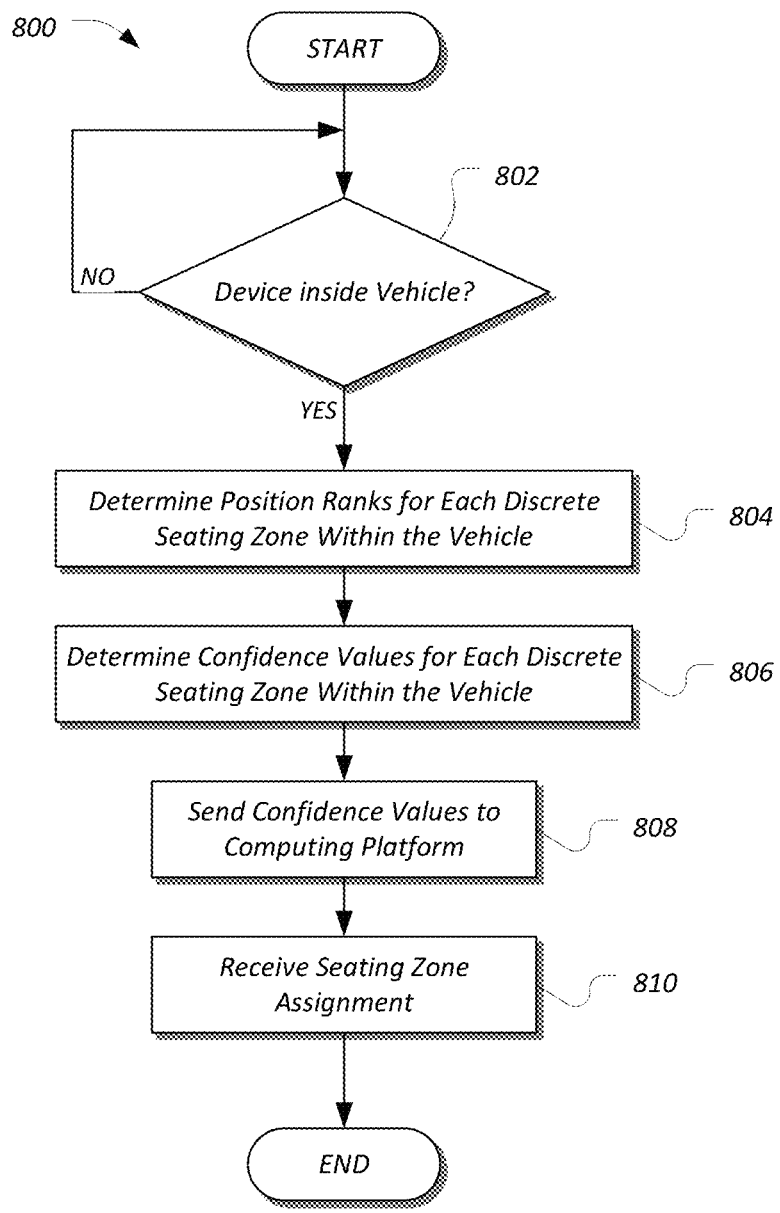
FIG. 8 illustrates an example process for updating seating zone assignments for users of mobile devices.

FIG. 8 illustrates an example process 800 for updating seating zone 204 assignments for users of mobile devices 152. The process 800 may be performed, in an example, by the mobile device 152 in communication with the computing platform 104 of the vehicle 102.

At operation 802, the mobile device 152 determines whether the mobile device 152 is within the vehicle 102. In an example, the mobile device 152 performs hypothesis testing by monitoring received snapshots 402 against a threshold signal strength value to determine whether the mobile device 152 is at considered to be inside the vehicle 102. In an example, the threshold signal strength value may be set to −50 dBm (decibel-milliwatts), although different threshold values may be used. In an example, the snapshot 402-C of the table 400 may indicate passage of the hypothesis test. If the text is passes, control passes to operation 804. Otherwise, control remains at operation 802.

At operation 804, the mobile device 152 determines position ranks 500 for the mobile device 152. In an example, the snapshot 402-C that passed the hypothesis test in operation 802 may be used to determine the position rank 500 signal strength values.

At operation 806, the mobile device 152 determines confidence values 600 for the position ranks 500. In an example, the mobile device 152 identifies the peak signal strength value for each value of the snapshot 402-C, and divides it by the threshold signal strength value.

At operation 808, the mobile device 152 sends the confidence values 600 to the computing platform 104. The computing platform 104 may then perform zone conflict resolution. An example process 900 for zone conflict resolution is described in detail below with respect to FIG. 9.

At operation 810, the mobile device 152 receives a seating zone 204 assignment from the computing platform 104. In an example, the computing platform 104 may send the mobile device 152 its seating zone 204 assignment responsive to the zone conflict resolution. After operation 810, the process 800 ends.

Figure 9:
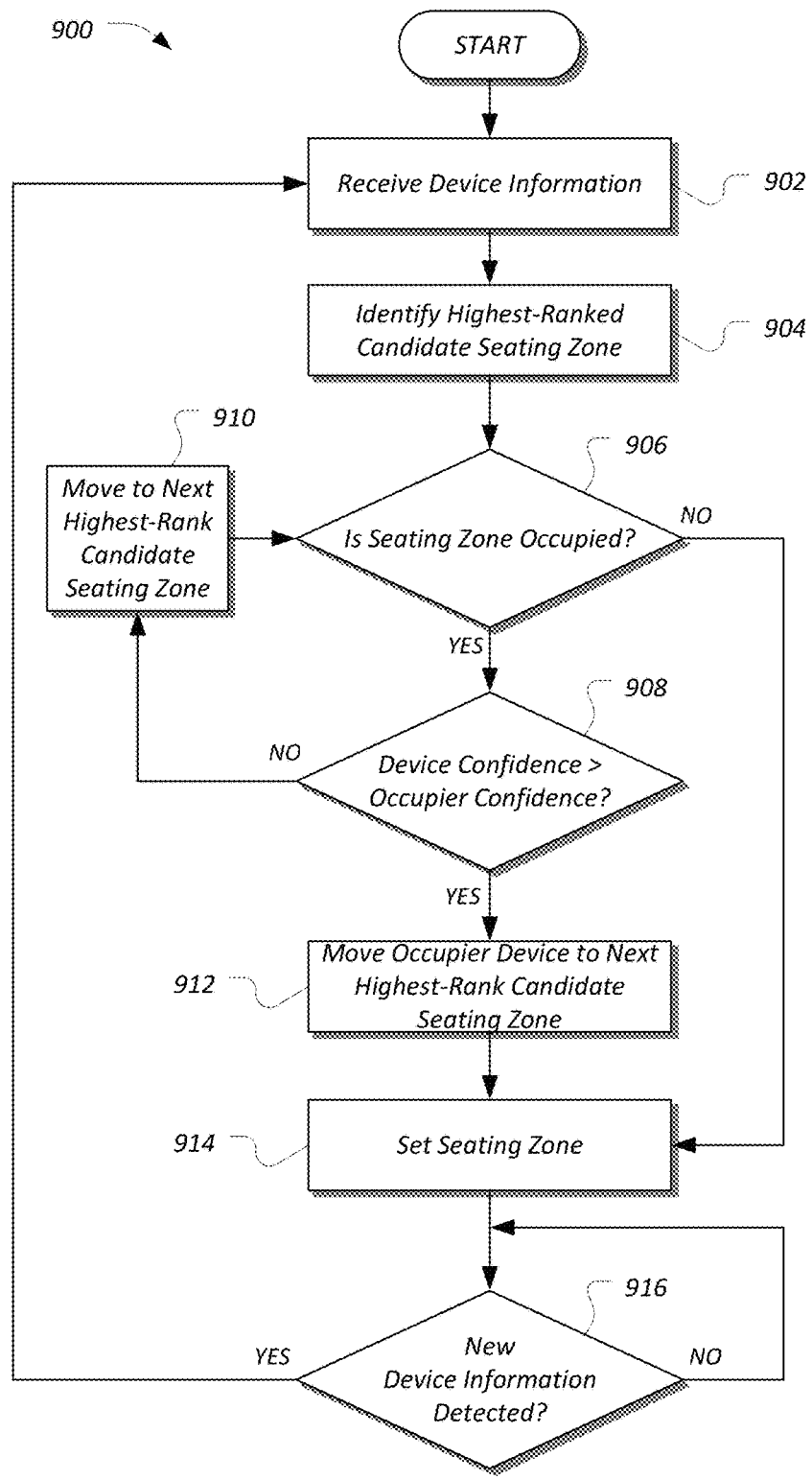
FIG. 9 illustrates an example process for performing zone conflict resolution.

FIG. 9 illustrates an example process 900 for performing zone conflict resolution. In an example, the process 900 may be performed by the computing platform 104 of the vehicle 102 in communication with multiple mobile devices 152.

At operation 902, the computing platform 104 receives confidence values 600 from a mobile device 152. In an example, the confidence values 600 are received from the mobile device 152 as sent in operation 808 of the process 800 discussed above. At operation 904, the computing platform 104 identifies the highest confidence value 600 seating zone 204 of the mobile device 152. In an example, the highest value may be seating zone 204 for which the lowest confidence value 600 number is associated. At operation 906, the computing platform 104 determines whether the identified highest confidence value 600 seating zone 204 is occupied by another mobile device 152. If so, control passes to operation 908. If not, control passes to operation 914.

At operation 908, the computing platform 104 determines whether the confidence value of the mobile device 152 to be added is greater than the confidence value of the mobile device 152 currently identified by the computing platform 104 as occupying the seating zone 204. If so, then control passes to operation 912 to move the occupier mobile device 152. If not, control passes to operation 910 to check the mobile device 152 at its next highest confidence value 600 seating zone 204.

At operation 910, the computing platform 104 moves to the next-highest confidence value 600 seating zone 204 for the mobile device 152, to attempt to see if the mobile device 152 should be placed in that seating zone 204 instead. After operation 910, control passes to operation 906.

At operation 912, the computing platform 104 moves the occupier mobile device 152 to the next-highest confidence value 600 seating zone 204 for the occupier mobile device 152. This change may further cause the computing platform 104 to rerun the process 900 for the occupier mobile device 152. At operation 914, the computing platform 104 sets the mobile device 152 to be in the approved highest-confidence value 600 seating zone 204.

At operation 916, the computing platform 104 determines whether new device information has been detected. As one possibility, the new device information may include receiving confidence values 600 from a mobile device 152 having entered the vehicle 102. As another possibility, the new device information may include changed information from an occupier mobile device 152 moved at operation 912. If new information is available, control passes to operation 902 to receive the new information.

Computing devices described herein, such as the mobile devices 152 and computing platform 104, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
wireless sensors; and
a processor programmed to
identify a highest-ranked seating zone for a mobile device using values determined from signal strengths from the wireless sensors, the values indicating probabilities of the mobile device being located in each of a plurality of seating zones,
assign the mobile device to the highest-ranked seating zone if the mobile device indicates a higher probability of being in the zone than other mobile devices, and
otherwise identify a next-highest-ranked seating zone for the mobile device, and assign the mobile device to the next-highest-ranked seating zone if the mobile device indicates a higher probability for the next-highest-ranked seating zone than other mobile devices.

2. The system of claim 1, wherein the highest-ranked seating zone is a driver seating zone.

3. The system of claim 1, wherein each seating zone is associated with a different respective door of a vehicle, and each one of the wireless sensors is embedded within a different door of the vehicle.

4. The system of claim 1, wherein the signal strength is measured according to BLUETOOTH Low Energy (BLE) protocol received signal strength information (RSSI) values.

5. The system of claim 1, wherein the mobile device is determined to be within a vehicle by using a hypothesis test comparing a threshold signal strength value to a snapshot of the signal strength from the wireless sensors.

6. The system of claim 5, wherein the values are determined using the signal strength from the wireless sensors and the threshold signal strength value.

7. A system comprising:
a mobile device having a wireless transceiver and programmed to
determine the mobile device is within a vehicle by using a hypothesis test comparing a threshold signal strength value to a snapshot of signal strength values,
responsive to determining the mobile device is located within the vehicle, determine position ranks for each of a plurality of seating zones of the vehicle using the signal strength values to vehicle wireless sensors,
determine confidence values for each of the seating zones using the position ranks, the confidence values determined by dividing the signal strength values by the threshold signal strength value, such that lower confidence values indicate greater probability of the mobile device being located in the seating zone, and
receive a seating zone assignment responsive to sending the confidence values to the vehicle.

8. The system of claim 7, wherein the mobile device is further programmed to utilize the snapshot of the signal strength values to indicate that the mobile device is within the vehicle, to determine the position ranks.

9. The system of claim 7, wherein the mobile device is further programmed to determine the confidence values using the signal strength values and the threshold signal strength value.

10. The system of claim 7, wherein the seating zone assignment is a driver seating zone.

11. A method comprising:
identifying, from mobile devices, confidence values determined from signal strength data from wireless sensors indicating probabilities of the mobile devices being located in vehicle seating zones; and responsive to two mobile devices indicating a highest confidence value for being located in the same seating zone, assigning the device with the higher confidence value to the zone and the other device to a seating zone for which the other device has a next highest confidence value and a higher probability for being located in the next-highest-ranked seating zone than other mobile devices.

12. The method of claim 11, further comprising determining the mobile device is within the vehicle by using a hypothesis test comparing a threshold signal strength value to a snapshot of the signal strength values.

13. The method of claim 12, further comprising:
utilizing the snapshot of the signal strength values indicating that the mobile device is within the vehicle to determine position ranks; and determining the confidence values using the position ranks.

14. The method of claim 11, wherein the same seating zone is a driver seating zone, and further comprising identifying the mobile device with the higher confidence value as being located within the driver seating zone.

15. A method comprising:
responsive to two mobile devices indicating a highest confidence value for being located in a first of multiple seating zones, assigning the device with the higher confidence value to the first seating zone and the other device to a second of the multiple seating zones for which the other device has a next highest confidence value and a higher probability for being located in the second seating zone than other mobile devices.

* * * * *